United States Patent
Choi et al.

(10) Patent No.: US 10,306,006 B2
(45) Date of Patent: May 28, 2019

(54) BIO-INSPIRED ALGORITHM BASED P2P CONTENT CACHING METHOD FOR WIRELESS MESH NETWORKS AND SYSTEM THEREOF

(71) Applicant: Korea Advanced Institute of Science and Technology, Daejeon (KR)

(72) Inventors: Jun Kyun Choi, Daejeon (KR); Seung Hyun Jeon, Daejeon (KR); Man Sun Park, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 418 days.

(21) Appl. No.: 15/003,740

(22) Filed: Jan. 21, 2016

(65) Prior Publication Data

US 2016/0234332 A1 Aug. 11, 2016

(30) Foreign Application Priority Data

Feb. 6, 2015 (KR) ........................ 10-2015-0018556

(51) Int. Cl.
| | |
|---|---|
| *G06F 15/16* | (2006.01) |
| *H04L 29/08* | (2006.01) |
| *G06F 17/30* | (2006.01) |
| *H04L 12/751* | (2013.01) |
| *H04L 12/747* | (2013.01) |

(52) U.S. Cl.
CPC .... *H04L 67/2842* (2013.01); *G06F 17/30206* (2013.01); *H04L 45/08* (2013.01); *H04L 67/1074* (2013.01); *H04L 45/742* (2013.01)

(58) Field of Classification Search
USPC ....................................................... 709/217
See application file for complete search history.

(56) References Cited

U.S. PATENT DOCUMENTS

| | | | | |
|---|---|---|---|---|
| 6,308,247 | B1 * | 10/2001 | Ackerman | .......... G06F 12/1036 |
| | | | | 711/202 |
| 6,907,501 | B2 * | 6/2005 | Tariq | ................... H04L 65/4084 |
| | | | | 455/439 |
| 7,327,685 | B2 * | 2/2008 | Ahn | ........................ H04L 45/00 |
| | | | | 370/238 |
| 7,668,173 | B2 * | 2/2010 | Zhao | ...................... H04L 45/18 |
| | | | | 370/395.21 |

(Continued)

FOREIGN PATENT DOCUMENTS

| | | |
|---|---|---|
| KR | 10-0577384 B1 | 5/2006 |
| KR | 10-2010-0057828 | 6/2010 |

(Continued)

OTHER PUBLICATIONS

Office Action for Korean Patent Application No. 10-2015-0018556, dated Nov. 19, 2015.

*Primary Examiner* — Alicia Baturay

(74) *Attorney, Agent, or Firm* — Marshall, Gerstein & Borun LLP

(57) ABSTRACT

A bio-inspired algorithm based P2P content caching method and system for mesh networks is provided. The bio-inspired algorithm based P2P content caching method for mesh networks includes the steps of checking a request of a content of a user in a mesh router, and searching the content from the mesh router, which is requested for the content, based on a bio-inspired algorithm.

14 Claims, 7 Drawing Sheets

(56) References Cited

U.S. PATENT DOCUMENTS

| | | | |
|---|---|---|---|
| 7,760,718 B2* | 7/2010 | Kamath | H04L 45/00 370/238 |
| 7,865,570 B2* | 1/2011 | Sun | G06F 12/0862 382/305 |
| 8,108,620 B2* | 1/2012 | Anderson | G06F 12/0813 711/130 |
| 8,447,875 B2* | 5/2013 | Liu | H04L 45/125 370/312 |
| 9,063,891 B2* | 6/2015 | Kegel | G06F 12/1441 |
| 9,270,584 B2* | 2/2016 | Hui | H04L 45/24 |
| 9,304,914 B1* | 4/2016 | Douglis | G06F 12/0802 |
| 2010/0124233 A1* | 5/2010 | Shi | H04L 45/00 370/401 |
| 2011/0191522 A1* | 8/2011 | Condict | G06F 12/123 711/103 |
| 2014/0040205 A1* | 2/2014 | Cometto | G06F 17/30194 707/639 |

FOREIGN PATENT DOCUMENTS

| KR | 10-2011-0071544 | 6/2011 |
|---|---|---|
| KR | 10-2012-0064278 | 6/2012 |
| KR | 10-2014-0018753 | 2/2014 |

\* cited by examiner

FIG. 3

LRU

| 0 | 1 | 2 | 3 | 0 | 1 | 5 | 0 | 1 | 5 | 3 | 4 | 2 | 3 | 0 | 2 | 1 | 4 | 5 | 0 | 4 | 2 | 1 | 3 |
|---|---|---|---|---|---|---|---|---|---|---|---|---|---|---|---|---|---|---|---|---|---|---|---|
| 3 | 3 | 3 | 3 | 3 | 3 | 3 | 3 | 3 | 3 | 3 | 3 | 3 | 3 | 3 | 3 | 3 | 3 | 5 | 5 | 5 | 5 | 5 | 5 |
| 5 | 5 | 5 | 5 | 5 | 5 | 5 | 5 | 5 | 5 | 5 | 4 | 4 | 4 | 4 | 4 | 4 | 4 | 4 | 4 | 4 | 4 | 4 | 4 | page fault = 2    miss ratio = 2/24 = 8.3%    hit ratio = 91.7%

ED-OPT

| 0 | 1 | 2 | 3 | 0 | 1 | 5 | 0 | 1 | 5 | 3 | 4 | 2 | 3 | 0 | 2 | 1 | 4 | 5 | 0 | 4 | 2 | 1 | 3 |
|---|---|---|---|---|---|---|---|---|---|---|---|---|---|---|---|---|---|---|---|---|---|---|---|
| 3 | 3 | 3 | 3 | 3 | 3 | 3 | 3 | 3 | 3 | 3 | 4 | 4 | 4 | 4 | 4 | 4 | 4 | 4 | 4 | 4 | 4 | 4 | 4 |
| 5 | 5 | 5 | 5 | 5 | 5 | 5 | 5 | 5 | 5 | 5 | 5 | 5 | 5 | 5 | 5 | 5 | 5 | 5 | 5 | 5 | 5 | 5 | 5 | page fault = 1    miss ratio = 1/24 = 4.2%    hit ratio = 95.8%

LFU

| 0 | 1 | 2 | 3 | 0 | 1 | 5 | 0 | 1 | 5 | 3 | 4 | 2 | 3 | 0 | 2 | 1 | 4 | 5 | 0 | 4 | 2 | 1 | 3 |
|---|---|---|---|---|---|---|---|---|---|---|---|---|---|---|---|---|---|---|---|---|---|---|---|
|   |   |   |   |   |   |   |   |   |   | × |   |   | 3 |   |   |   | × | 5 |   |   |   |   |   |
| 3 | 3 | 3 | 3 | 3 | 3 | 3 | 3 | 3 | 3 | 3 | 3 | 3 | 3 | 3 | 3 | 3 | 3 | 3 | 3 | 3 | 3 | 3 | 3 |
| 5 | 5 | 5 | 5 | 5 | 5 | 5 | 5 | 5 | 5 | 5 | 4 | 4 | 4 | 4 | 4 | 4 | 5 | 5 | 4 | 4 | 4 | 4 | 4 | page fault = 3    miss ratio = 3/24 = 12.5%    hit ratio = 87.5%

ED-LRU (Evicting Duplicate based LRU)

| 0 | 1 | 2 | 3 | 0 | 1 | 5 | 0 | 1 | 5 | 3 | 4 | 2 | 3 | 0 | 2 | 1 | 4 | 5 | 0 | 4 | 2 | 1 | 3 |
|---|---|---|---|---|---|---|---|---|---|---|---|---|---|---|---|---|---|---|---|---|---|---|---|
| 3 | 3 | 3 | 3 | 3 | 3 | 3 | 3 | 3 | 3 | 3 | 4 | 4 | 4 | 4 | 4 | 4 | 4 | 4 | 4 | 4 | 4 | 4 | 4 |
| 5 | 5 | 5 | 5 | 5 | 5 | 5 | 5 | 5 | 5 | 5 | 5 | 5 | 5 | 5 | 5 | 5 | 5 | 5 | 5 | 5 | 5 | 5 | 5 | page fault = 1    miss ratio = 1/24 = 4.2%    hit ratio = 95.8%

ED-LRU (Evicting Duplicate based LFU)

| 0 | 1 | 2 | 3 | 0 | 1 | 5 | 0 | 1 | 5 | 3 | 4 | 2 | 3 | 0 | 2 | 1 | 4 | 5 | 0 | 4 | 2 | 1 | 3 |
|---|---|---|---|---|---|---|---|---|---|---|---|---|---|---|---|---|---|---|---|---|---|---|---|
| 3 | 3 | 3 | 3 | 3 | 3 | 3 | 3 | 3 | 3 | 3 | 4 | 4 | 4 | 4 | 4 | 4 | 4 | 4 | 4 | 4 | 4 | 4 | 4 |
| 5 | 5 | 5 | 5 | 5 | 5 | 5 | 5 | 5 | 5 | 5 | 5 | 5 | 5 | 5 | 5 | 5 | 5 | 5 | 5 | 5 | 5 | 5 | 5 | page fault = 1    miss ratio = 1/24 = 4.2%    hit ratio = 95.8%

BIO-INSPIRED ALGORITHM BASED P2P CONTENT CACHING METHOD FOR WIRELESS MESH NETWORKS AND SYSTEM THEREOF

CROSS-REFERENCE TO RELATED APPLICATION(S)

This application claims the benefit under 35 U.S.C. § 119(a) of a Korean patent application filed on Feb. 6, 2015 in the Korean Intellectual Property Office and assigned Serial number 10-2015-0018556, the entire disclosure of which is hereby incorporated by reference.

TECHNICAL FIELD

The present disclosure relates to a bio-inspired algorithm based Peer-to-Peer (P2P) content caching method and system in mesh networks and more particularly, to a P2P content caching method and system for searching caches based on a bio-inspired algorithm in mesh networks.

BACKGROUND

An ant colony algorithm is inspired from the behavior of an ant colony conveying feed, which are distant from their destination, by way of the shortest route and provided as a solution for finding a moving route or for allocating missions in communication networks. Such an algorithm is like that ants spread pheromone when they are passing through routes between links and thereby the ants may find the optimum routes while moving along places in which the pheromone is heavily spread. The probability that ants move to the next route can be determined by an amount of pheromone, an interval between links, and a weight permitted to information quantity. Korean Patent Publication No. 10-2011-0071544 discloses an optimized clustering design method using such an ant algorithm in a wireless sensor network, in which a bio-inspired algorithm is used to adjust an amount of pheromone information of a cluster head and to maximize a lifetime of the sensor network.

SUMMARY

An aspect of the present disclosure is to provide a P2P content caching method and system for searching caches based on a bio-inspired algorithm in mesh networks.

Another aspect of the present disclosure is to provide a bio-inspired algorithm based P2P content caching method and system, for mesh networks, capable of offering a P2P service by using a bio-inspired algorithm (e.g., ACO) to solve delays to page faults which may occur while caching a content in a requested mesh router (MR).

In accordance with an aspect of the present disclosure, a bio-inspired algorithm based P2P content caching method for mesh networks may include the steps of checking a request of a content of a user in a mesh router; and searching the content from the mesh router, which is requested for the content, based on a bio-inspired algorithm.

The step of searching the content may include, if a page fault occurs while caching the content, the step of performing a search in priority with the mesh router of the mesh network based on Ant colony Optimization (ACO).

The step of searching the content may include the step of giving pheromone information, for which the mesh router transmits an ant packet, to each link.

The step of searching the content may include the step of extending a caching range of the content in the mesh router by 1-hop neighbor router caching and searching the content.

The method may include the steps of checking presence or absence of a duplicate content in a page of the cache as well as in a neighbor node; and if the duplicate content is present, replacing the page by adding a new content to the page or by updating the page with the new content after deleting the duplicate content.

The step of replacing the page may include, if the content is absent in the page of the cache, the step of replacing the page by adding a new content or by updating the page with the new content after deleting contents in the order from a least recently used one of an access history.

The step of replacing the page may include, if the content is absent in the page of the cache, the step of replacing the page by adding a new content or by updating the page with the new content after deleting contents in the order from a least used one of an access history.

The step of replacing the page comprises: if an access history to be referred is absent, replacing the page by adding the content the page or by updating the page with the content.

In another aspect of the present disclosure, a bio-inspired algorithm based P2P content caching system for mesh networks may include a checking part configured to check a request of a content of a user in a mesh router; and a searching part configured to search the content from the mesh router, which is requested for the content, based on a bio-inspired algorithm and to provide the content for the user.

The system may further include a storage part configured to act as a cache of the mesh router and to store the content in a cache of the mesh router.

If a page fault occurs while caching the content, the searching part may perform a search in priority with the mesh router of the mesh network based on Ant colony Optimization (ACO).

The searching part may give pheromone information, for which the mesh router transmits an ant packet, to each link.

The searching part may extend a caching range of the content in the mesh router by 1-hop neighbor router caching and may search the content.

The storage part may check presence or absence of a duplicate content in a page of the cache as well as in a neighbor node and if the duplicate content is present, may replace the page by adding a new content to the page or by updating the page with the new content after deleting the duplicate content.

If the content is absent in the page of the cache, the searching part may replace the page by adding a new content or by updating the page with the new content after deleting contents in the order from a least recently used one of an access history.

If the content is absent in the page of the cache, the replacing part may replace the page by adding a new content or by updating the page with the new content after deleting contents in the order from a least used one of an access history.

If an access history to be referred is absent, the replacing part may replace the page by adding the content the page or by updating the page with the content.

According to embodiments of the present disclosure, even with difficulty in providing a P2P service due to multi-hop throughput degradation which is regarded as a traditional problem of wireless mesh networks (WMN), it may be allowable to solve delays to page faults, which may occur while caching a content in a requested mesh router (MR), by using a bio-inspired algorithm (e.g., ACO).

Using Evicting Duplicate based Least Frequently Used (ED-LFU) and Evicting Duplicate based Least Recently Used (ED-LRU) which are useful for reducing indiscreet storage of duplicate contents into caches of mesh routers, embodiments of the present disclosure may be helpful to lessen multi-hop relays while ants (ant packets) are searching nearby content caches.

When page faults occur, Ant Colony Optimization (ACO) is performed to search content caches from peers. According to embodiments of the present disclosure may be efficient in reducing Expected Transmission Time (ETT) of ants which are generated during a search of the content caches.

BRIEF DESCRIPTION OF THE DRAWINGS

FIG. 3 is a diagram exemplarily illustrating a feature of page replacement for content requests in accordance with an embodiment of the present disclosure.

DETAILED DESCRIPTION

Hereinafter, various embodiments of the present disclosure will be described in conjunction with the accompanying drawings. Various embodiments described herein, however, may not be intentionally confined in specific embodiments, but should be construed as including diverse modifications, equivalents, and/or alternatives. Throughout the drawings, it should be noted that like reference numbers are used to depict the same or similar elements, features, and structures. Hereinafter, embodiments of the present disclosure will be described in conjunction with the accompanying drawings.

Embodiments of the present disclosure are concerned with a method and system for searching caches based on a bio-inspired algorithm in mesh networks. Mesh networks may be formed when there is a need of overcoming outage areas appearing among general cellular networks. Ant Colony Optimization (ACO) may be available for such a bio-inspired algorithm Additionally, if there is a content request for a mesh router, it may be permissible to extend a content caching range by 1-hop neighbor router caching For this, a manner such as web caching may be available.

Figure 1:
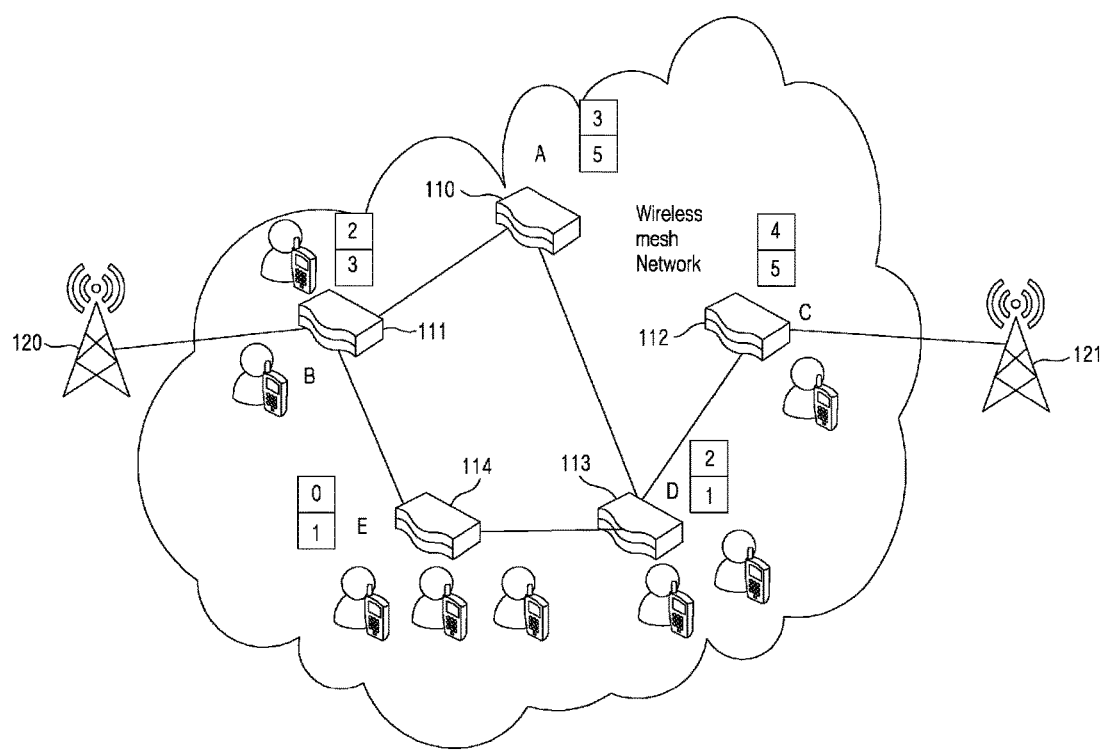
FIG. 1 is a diagram illustrating a P2P mesh network structure in accordance with an embodiment of the present disclosure.

FIG. 1 is a diagram illustrating a P2P mesh network structure in accordance with an embodiment of the present disclosure.

Referring to FIG. 1, a mesh network may be formed in an outage area between wireless cellular networks for a P2P service. In detail, a mesh network may be formed to provide a P2P service in an area to which signals of base stations 120 and 121 with different frequencies cannot be reached.

A P2P service means a kind of communication service for allowing users to exchange or share diverse information or files in connection with other users' computers through a network such as the internet.

In such a P2P mesh network structure, a user may request contents from mesh routers through a user terminal. A user terminal may include a mobile, a smart device, a tablet PC, a laptop computer, or PC.

Mesh routers (MR) 110~114 may be requested for contents by a user through a user terminal and then may check the request.

A mesh router may have caches and a cache may store contents. For example, a mesh router may have two caches, but the number of caches may be variable without fixation.

Contents stored in caches may be given with identifications (IDs). For example, content IDs may be set on 0~5. In the same manner, even mesh routers may be given with IDs. For example, mesh router IDs may be set on A~E.

If a mesh router receives a content request, the 1-hop neighbor router caching may be used to extend a content caching range. For example, a method such as web caching may be used therefor.

In the case that a page fault occurs during a content caching, it may be available to perform a search in priority with mesh routers of ACO-based mesh network.

Then, a mesh router may transmit an ant packet to give pheromone information per link. The ant packet may indicate a data packet and the pheromone information may act as a weighting factor for each link.

In case that a content requested by a user is absent therein, a wireless cellular network may be used to directly request the content from a content server.

For example, as illustrated in FIG. 1, a P2P mesh network model may be figured as including, e.g., five mesh routers by mesh topology in an outage area between cellular base stations. In this structure, all contents may be randomly distributed over the mesh routers. For example, caches of the mesh routers may be assumed as not being empty.

Hereinbelow, several assumptions may be considered as follows.

All mobile routers may be fixed, each mesh router may store two contents in its cache at maximum, and each mesh router may search contents within caches of 1-hop neighbor nodes.

Additionally, when a page fault occurs, a mesh router may search content based on a bio-inspired algorithm in priority.

It may be also assumed that the number of contents is larger than the number of mesh routers and requests by the mesh routers do not occur coincidently.

A content requesting sequence for all mesh routers, i.e., content IDs, may be represented as follows. For example, the content IDs may be generated at random.

S={0, 1, 2, 3, 0, 1, 5, 0, 1, 5, 3, 4, 2, 3, 0, 2, 1, 4, 5, 0, 4, 2, 1, 3}

To identify the mesh routers 110~114, mesh router IDs may be given in A~E. To identify contents, content IDs may be given in 0~5.

Figure 2:
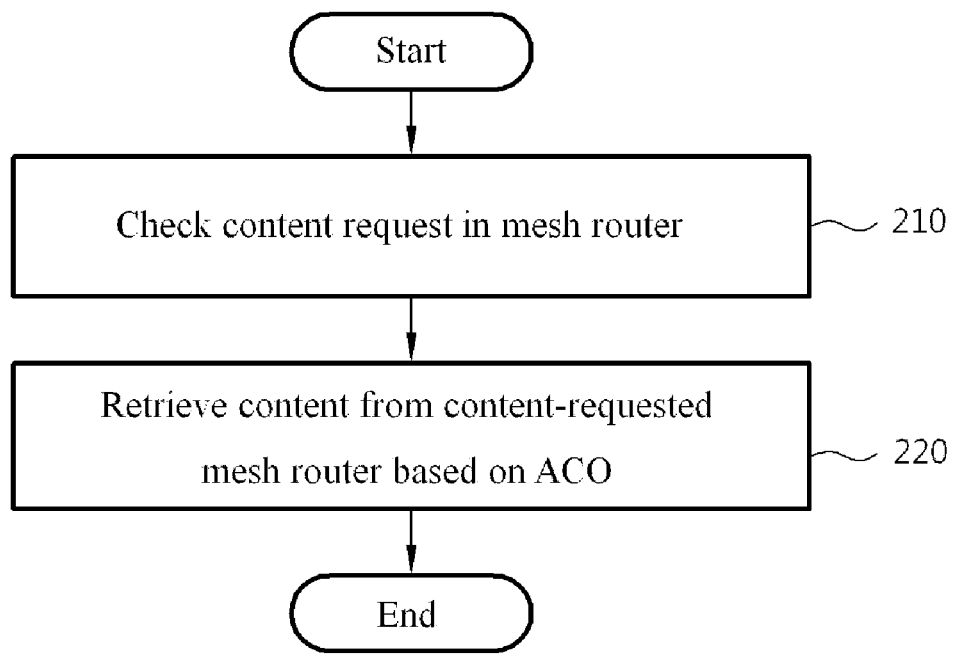
FIG. 2 is a flow chart showing a bio-inspired algorithm based P2P content caching method for mesh networks in accordance with an embodiment of the present disclosure.

FIG. 2 is a flow chart showing a bio-inspired algorithm based P2P content caching method for mesh networks in accordance with an embodiment of the present disclosure.

Referring to FIG. 2, the bio-inspired algorithm based P2P content caching method for mesh networks may be described below in detail with a bio-inspired algorithm based P2P content caching system for mesh networks.

At step 210, the bio-inspired algorithm based P2P content caching method for mesh networks may confirm a content request of a user in a mesh router.

At step 220, the bio-inspired algorithm based P2P content caching method for mesh networks may search a content from the mesh router, which is requested for the content, based on a bio-inspired algorithm.

In searching a content, if a page fault occurs while caching the content, mesh routers of an ACO-based mesh network may be searched in priority. Additionally, a mesh router may transmit an ant packet to give pheromone information to each link. The ant packet may mean a data packet and the pheromone information may be a weighting factor of each link.

Additionally, in searching a content, a mesh router may use the 1-hop neighbor router caching to extend a content caching range.

Additionally, the bio-inspired algorithm based P2P content caching system for mesh networks may include a step of storing a content in a cache of a mesh router and may search the content, which is requested by a user, from the stored content.

A page fault may be prevented by the step of storing contents in a cache of a mesh router, by including: a step of checking presence or absence of a duplicate content in pages of all caches in addition to neighbor nodes; and a step of, if there is the duplicate content, replacing the corresponding page by adding a new content to the page or by updating the page with the new content after deleting the duplicate content. During this, if there is no duplicate content in pages of all caches as well as in neighbor nods, it may be permissible to use at least one of Least Recently Used (LRU) and Least Frequently Used (LFU) modes. For example, in the case that a current cache does not have a content, if a duplicate of the content is found in a cache of a mesh router, which is connected with a user, after searching the content by an ant from the routers including 1-hop neighbor mesh routers, the duplicate may be first deleted to solve a page fault. If there is absent a duplicate content, the LRU or LFU mode may not be adopted thereto.

The step of replacing pages may include, in the case that a corresponding content is absent in pages of a current cache, a step of adding new contents to the pages or by updating the pages with the new contents after deleting contents in the order from the recent rarely-used one of the access history according to an Evicting Duplicate LRU (ED-LRU) mode. On the other hand, as aforementioned, for a search of contents, the 1-hop neighbor router caching may be used by a mesh router to extend a content caching range.

An ED-LRU mode may be available to check presence or absence of a duplicate content in pages of all caches as well as neighbor nodes and thereafter, if there is the duplicate content, may delete the duplicate content and then may update the corresponding cache with a new content. In the case that pages of a current cache do not have any content, it may be permissible to add new contents to the pages or update the pages with the new contents after deleting contents in the order from the recent rarely-used one of the access history. In the case that duplication of contents is found in multiplicity, it may be available to employ an LRU mode. Additionally, in the case that there is absent an access history to be referred, it may be permissible to add requested contents to pages in the order of the pages.

Additionally, the step of replacing pages may be carried out by, if pages of a current cache do not have a corresponding content, adding new contents to the pages or by updating the pages with the new contents after deleting contents in the order from the least used one of the access history according to an Evicting Duplicate LFU (ED-LFU) mode. Additionally, as aforementioned, for a search of contents, a content caching range may be extended in a mesh router by using the 1-hop neighbor router caching.

An ED-LFU mode may be available to check presence or absence of a duplicate content in pages of all caches as well as neighbor nodes and thereafter, if there is the duplicate content, may delete the duplicate content and then may update the corresponding cache with a new content. In the case that pages of a current cache do not have any content, it may be permissible to add new contents to the pages or update the pages with the new contents after deleting contents in the order from the least used one of the access history. In the case that duplication of contents is found in multiplicity, it may be available to employ an LFU mode. Additionally, in the case that there is absent an access history to be referred, it may be permissible to add requested contents to pages in the order of the pages.

Summarily, a bio-inspired algorithm based P2P content caching system for mesh networks may replace pages by adding requested contents to the pages or by updating the pages with the requested contents in the order of the pages in the case that there is absent an access history to be referred. In the case that duplication of contents is beyond a specific reference, at least one of LRU and LFU modes may be also employed to replace pages.

FIG. 3 is a diagram exemplarily illustrating a feature of page replacement for content requests in accordance with an embodiment of the present disclosure.

From FIG. 3 for page replacement of an A'th mesh router for a content request S, it can be seen by hatchings that page faults occur and mark algorithms are applied thereto as indicated by x marks.

Figures 4A, 4B:
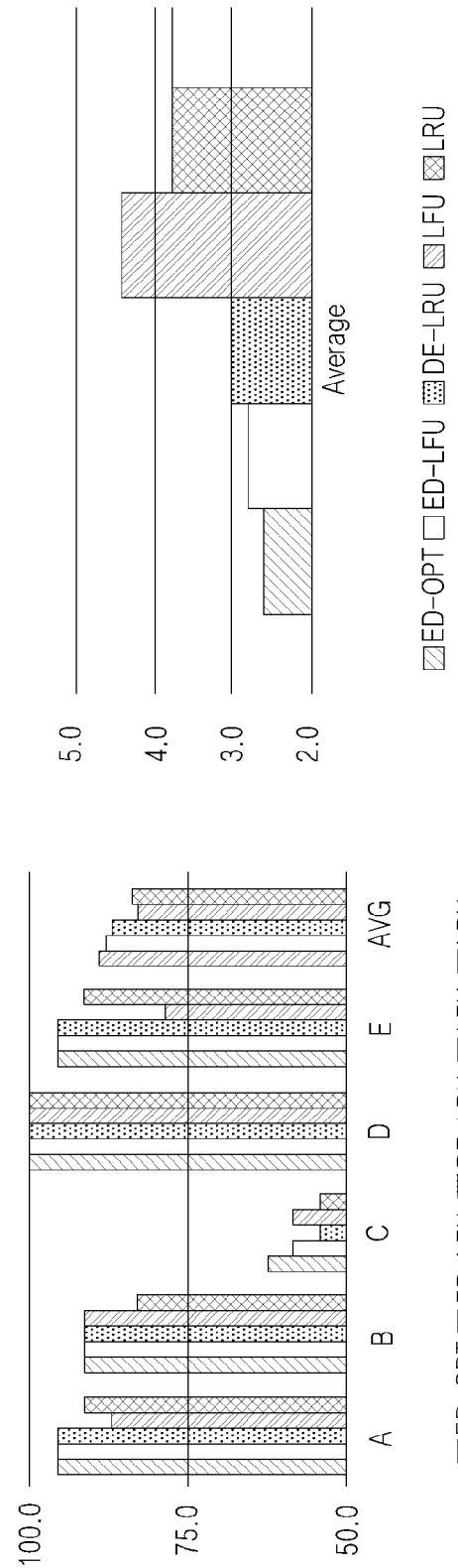
FIGS. 4A and 4B are graphic diagrams showing average cache hit ratios and average page fault frequencies in accordance with an embodiment of the present disclosure.

FIGS. 4A and 4B are graphic diagrams showing average cache hit ratios and average page fault frequencies in accordance with an embodiment of the present disclosure.

From FIG. 4A, it can be seen that average cache hit ratios result from the ED-LFU and ED-LRU modes and that the ED-LFU mode is more familiar to an optimal (OPT) page replacement algorithm than the ED-LRU mode. Even in the case of OPT, duplication may be evicted under the same condition.

From FIG. 4B, it can be seen of average page fault frequencies for the ED-LFU and ED-LRU modes. In this feature, it can be seen that the ED-LFU mode is lower than the ED-LRU mode in average page fault frequency.

Hereinbelow, a bio-inspired algorithm based content searching method will be described in detail.

A bio-inspired algorithm based content searching method may determine an l'th mesh router, which is a 1-hop neighbor node, through ACO. This may be given by Equation 1.

$$1 = \mathop{\mathrm{argmax}}_{p_{i1}^k} p_{i1}^k p_1^k(C_{\mathrm{id\_no}}) \quad \text{[Equation 1]}$$

In Equation 1, $p_{il}^k$ denotes the probability of moving from an i'th mesh router to an l'th mesh router and may be determined by an amount of pheromone, being dependent on path loss or an interval between mesh routers.

Additionally, $p_l^k(C_{id\_no})$ may denote the probability that a k'th ant finds an id_no'th content. Accordingly, it may decrease the number of the l.

An Expected Transmission Time (ETT) of the k'th ant from the i'th router to the l'th router may be given by Equation 2.

$$ETT_{i1}^k = \frac{1}{df_{i1}^k dr_{i1}^k} \times \frac{S}{B} \qquad \text{[Equation 2]}$$

In Equation 2, $df_{il}^k$ and $dr_{il}^k$ may denote transmission and reception rates of a link, S may denote a size of an ant packet, and B may denote a link bandwidth. Accordingly, a delay due to a content caching may be reduced by minimizing an ETT.

Figure 5:
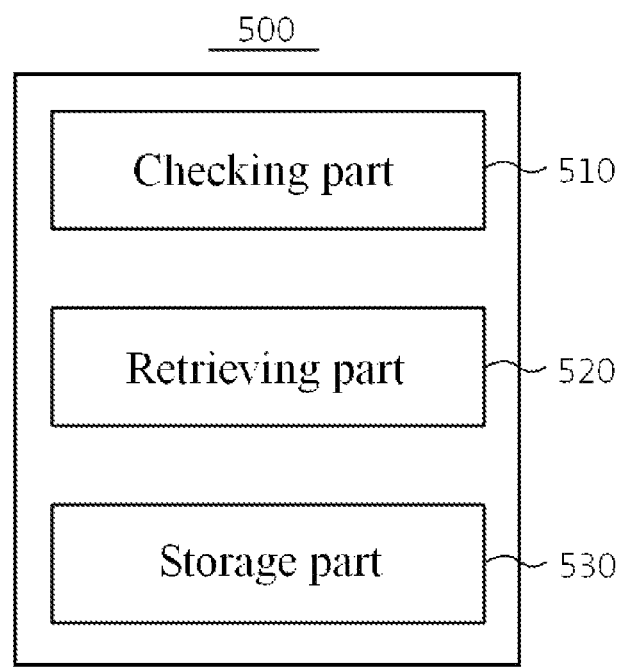
FIG. 5 is a block diagram illustrating a configuration of a bio-inspired algorithm based P2P content caching system for mesh networks in accordance with an embodiment of the present disclosure.

FIG. 5 is a block diagram illustrating a configuration of a bio-inspired algorithm based P2P content caching system for mesh networks in accordance with an embodiment of the present disclosure.

Referring to FIG. 5, a bio-inspired algorithm based P2P content caching system 500 for mesh networks may include a checking part 510, a searching part 520, and a storage part 30. Although not described specifically, the system may further include a controller for controlling those functional elements. The bio-inspired algorithm based P2P content caching system for mesh networks will not be further described later in duplication because other elements except principal elements may be referred to the former description about the bio-inspired algorithm based P2P content caching method for mesh networks in conjunction with FIGS. 1 to 4B.

The checking part 510 may confirm a content request of a user to a mesh router.

The searching part 520 may provide a content to a user by searching the content from a mesh router which is requested for the content, based on a bio-inspired algorithm.

In the case that a page fault occurs while caching a content, the searching part 520 may first search the content through mesh routers of an ACO-based mesh network. Additionally, the searching part 520 may give pheromone information, for which a mesh router transmits an ant packet, to each link. The ant packet may indicate a data packet and the pheromone information may act as a weighting factor for each link. For a search of contents, the 1-hop neighbor router caching may be used by a mesh router to extend a content caching range.

The storage part 530, as a cache of a mesh router, may store contents.

The storage part 530 may check presence or absence of a duplicate content in pages of caches included in neighbor nodes. In the case that a duplicate content is present therein, the storage part 530 may replace a corresponding page by adding a new content to the page or by updating the page with the new content after deleting the duplicate content. Additionally, in the case that there are absent contents in pages of caches, the storage part 530 may replace the pages by adding new contents to the pages or by updating the pages with the new contents after deleting contents in the order from the recent rarely-used one of the access history.

In the case that there are absent contents in pages of caches, it may be permissible to replace the pages by adding new contents to the pages or by updating the pages with the new contents after deleting contents in the order from the least used one of the access history. If there is absent an access history to be referred, it may be permissible to add requested contents to pages in the order of the pages.

Figure 6:
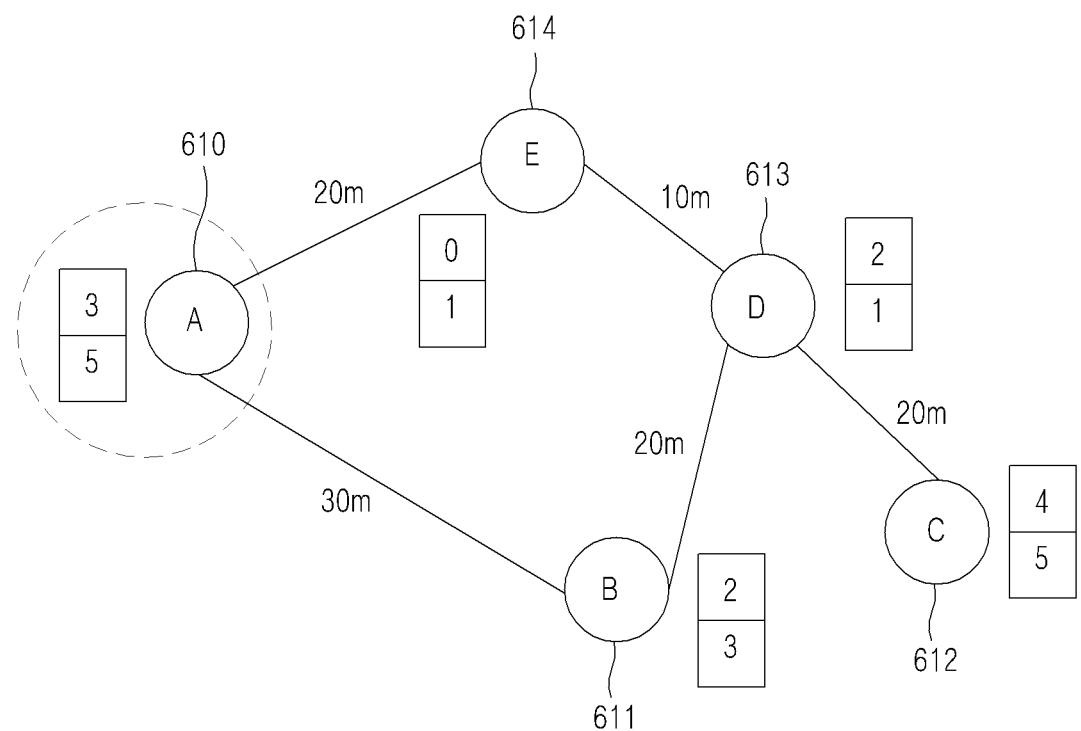
FIG. 6 is a diagram exemplarily illustrating a scheme for checking an Expected Transmission Time (ETT) through a bio-inspired algorithm based content searching method according to an embodiment of the present disclosure.

FIG. 6 is a diagram exemplarily illustrating a scheme for checking an Expected Transmission Time (ETT) through a bio-inspired algorithm based content searching method according to an embodiment of the present disclosure.

Figure 7:
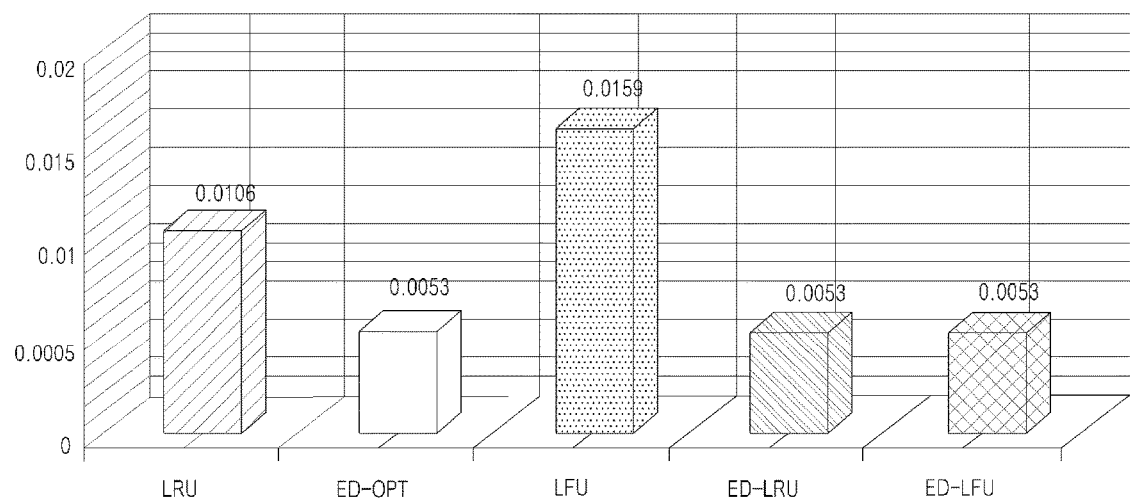
FIG. 7 is a graphic diagram showing ETT functionality in accordance with an embodiment of the present disclosure.

FIG. 7 is a graphic diagram showing ETT functionality in accordance with an embodiment of the present disclosure.

From FIG. 6, it can be seen of ETT values resulting from the aforementioned bio-inspired algorithm based content searching method.

Mesh routers (MR) 610~614 may be requested for contents by a user through a user terminal and then may check the request. A mesh router may have caches and a cache may store contents. For example, a mesh router may have two caches, but the number of caches may be variable without fixation. Contents stored in caches may be given with identifications (IDs). For example, content IDs may be set on 0~5. In the same manner, even mesh routers may be given with IDs. For example, mesh router IDs may be set on A~E.

If a mesh router receives a content request, the 1-hop neighbor router caching may be used to extend a content caching range.

In the case that a page fault occurs during a content caching, it may be available to perform a search in priority with mesh routers of ACO-based mesh network. During this, in the case that page faults occur in the mesh routers A~E, it may be permissible to calculate a time for finding caches from a mesh router, which is requested for a content, to caches of other neighbor mesh router by an ant based on ACO.

For example, when MR=A, it may be permissible to compare ETTs respective to algorithms each other. The ETT functionality considering a path loss model may be verified with reference to "Wireless LAN Comes of Age: Understanding the IEEE 802. 11n Amendment (T. K. Paul and T. Ogunfunmi, IEEE Circuits Syst. Mag., vol. 8, no. 1, pp. 28-54, First Quarter 2008) after assuming an interval between the mesh routers. This ETT functionality may be shown as FIG. 7 in graphic form.

According to embodiments of the present disclosure, although the difficulty of P2P service due to multi-hop throughput degradation which has been regarded as a traditional problem on wireless mesh networks (WMN), it may be allowable to lessen delays to page faults occurring during a content caching of a mesh router requested for a content through a bio-inspired algorithm (e.g., ACO).

Additionally, since the ED-LFU and ED-LRU modes are helpful in reducing effects of indiscreetly storing duplicate contents in caches of mesh routers for P2P service, it may be accomplishable to lessen multi-hop relays while ants are searching nearby content caches.

Additionally, it may be allowable for ED-LRU and ED-LFU modes to prevent a serious page error which is caused from a critical delay of content caching in a neighbor router and from link deficiency of a mesh router.

Additionally, it may be accomplishable to reduce ETTs of ants which are generated while a content caching is being searched among peers by ACO when a page fault occurs.

A system described above may be implemented in hardware elements, software elements, and/or a combination of hardware and software elements. For example, an system, unit, or element described above may be implemented with one or more universal or special computers, such as processor, controller, Arithmetic Logic Unit (ALU), digital signal processor, microcomputer, Field Programmable Gate Array (FPGA), Programmable Logic Unit (PLU), microprocessor, or other units capable of executing and responding instructions. A processing unit may perform an Operating System (OS) and one or more software applications executed in the OS. Additionally, a processing unit may access, store, control, and generate data in response to software executions. Although some embodiment is illustrated as employing one processing unit for convenience of understanding, it can be seen by those skilled in the art that a plurality and/or diversity of processing elements may be included in use. For example, a processing unit may include a plurality of processors or one processor and one controller. Additionally, a processing unit may be formed in other processing configuration like a parallel processor.

Software may include computer programs, codes, instructions, or one or more combinations with them, may configure a processing unit, or may instruct a processing unit independently or collectively. For being interpreted by a processing unit or for providing instructions or data to a processing unit, software and/or data may be embodied permanently or temporarily in some kind of machine, component, physical system, virtual equipment, computer storage medium or unit, or transmitted signal wave. Software may be distributed in computer systems connected through a network and may be stored and executed in distribution. Software and data may be stored in one or more computer-readable recording media.

Methods according to embodiments of the present disclosure may be implemented in the form of program instructions executable through diverse computing means and may be recorded in computer readable media. The computer readable media may include independently or associatively program instructions, data files, data structures, and so on. Program instructions recorded in the media may be specially designed and configured for embodiments, or may be generally known by those skilled in the computer software art. Computer readable recording media may include magnetic media such as hard disks and floppy disks, optical media such as CD-ROM and DVD, magneto-optical media such as floptical disks, and hardware units, such as ROM, RAM, flash memory, and so on, which are intentionally formed to store and perform program instructions. Program instructions may include high-class language codes executable by computers using interpreters, as well as machine language codes likely made by compilers. The hardware units may be configured to function as one or more software modules for performing operations according to embodiments of the present disclosure, and vice versa.

While embodiments of the present disclosure have been shown and described with reference to the accompanying drawings thereof, it will be understood by those skilled in the art that various changes and modifications in form and details may be made therein without departing from the spirit and scope of the present disclosure as defined by the appended claims and their equivalents. For example, it may be allowable to achieve desired results although the embodiments of the present disclosure are preformed in other sequences different from the descriptions, and/or the elements, such as system, structure, device, circuit, and so on, are combined or assembled in other ways different from the descriptions, replaced or substituted with other elements or their equivalents.

Therefore, other implementations, other embodiments, and equivalents of the appended claims may be included in the scope of the appended claims.

What is claimed is:

1. A bio-inspired algorithm based P2P content caching method for a mesh network, the method comprising:
checking a request of a content of a user in a mesh router; and
searching the content from the mesh router, which is requested for the content, based on a bio-inspired Ant Colony Optimization (ACO) algorithm, wherein the searching of the content comprises:
giving pheromone information, for which the mesh router transmits an ant packet, to each link; and
if a page fault occurs while caching the content, calculating a time for finding caches of a neighbor mesh router of the mesh network from the mesh router based on the ant packet while performing a search in priority with the neighbor mesh router of the mesh network based on the ACO algorithm.

2. The method of claim 1, further comprising: storing the content in a cache of the mesh router.

3. The method of claim 2, wherein the searching of the content comprises: extending a caching range of the content in the mesh router by 1-hop neighbor router caching and searching the content.

4. The method of claim 2, wherein the storing of the content comprises: checking presence or absence of a duplicate content in a page of the cache as well as in a neighbor node; and if the duplicate content is present, replacing the page by adding a new content to the page or by updating the page with the new content after deleting the duplicate content.

5. The method of claim 4, wherein the replacing of the page comprises: if the content is absent in the page of the cache, replacing the page by adding a new content or by updating the page with the new content after deleting contents in the order from a least recently used one of an access history though an Evicting Duplicate based Least Recently Used (ED-LRU) mode.

6. The method of claim 4, wherein the replacing of the page comprises: if the content is absent in the page of the cache, replacing the page by adding a new content or by updating the page with the new content after deleting contents in the order from a least used one of an access history though an Evicting Duplicate based Least Frequently Used (ED-LFU) mode.

7. The method of claim 4, wherein the replacing of the page comprises: if an access history to be referred is absent, replacing the page by adding the content the page or by updating the page with the content.

8. A bio-inspired algorithm based P2P content caching system fora mesh network, the system comprising:
one or more processors configured to check a request of a content of a user in a mesh router and to search the content from the mesh router, which is requested for the content, based on a bio-inspired Ant Colony Optimization (ACO) algorithm and to provide the content for the user,
wherein the one or more processors search the content by:
giving pheromone information, for which the mesh router transmits an ant packet, to each link; and
if a page fault occurs while caching the content, calculating a time for finding caches of a neighbor mesh router of the mesh network from the mesh router based on the ant packet while performing a search in priority with the neighbor mesh router of the mesh network based on the ACO algorithm.

9. The system of claim 8, further comprising: a storage part configured to act as a cache of the mesh router and to store the content in a cache of the mesh router.

10. The system of claim 9, wherein the storage part checks presence or absence of a duplicate content in a page of the cache as well as in a neighbor node and if the duplicate content is present, replaces the page by adding a new content to the page or by updating the page with the new content after deleting the duplicate content.

11. The system of claim 10, wherein if the content is absent in the page of the cache, the one or more processors replaces the page by adding a new content or by updating the page with the new content after deleting contents in the order from a least recently used one of an access history though an Evicting Duplicate based Least Recently Used (ED-LRU) mode.

12. The system of claim 10, wherein if the content is absent in the page of the cache, the replacing part replaces the page by adding a new content or by updating the page with the new content after deleting contents in the order from a least used one of an access history though an Evicting Duplicate based Least Frequently Used (ED-LFU) mode.

13. The system of claim 10, wherein if an access history to be referred is absent, the replacing part replaces the page by adding the content the page or by updating the page with the content.

14. The system of claim 8, wherein the one or more processors extends a caching range of the content in the mesh router by 1-hop neighbor router caching and searches the content.

* * * * *